United States Patent
Rosa et al.

(10) Patent No.: US 9,301,646 B2
(45) Date of Patent: Apr. 5, 2016

(54) MODULAR TWO-SIDED GRILL

(71) Applicant: GARLAND COMMERCIAL INDUSTRIES LLC., New Port Richey, FL (US)

(72) Inventors: Paulo J. Rosa, Mississauga (CA); Douglas S. Jones, New Port Richey, FL (US)

(73) Assignee: GARLAND COMMERCIAL INDUSTRIES LLC., New Port Richey, FL (US)

(*) Notice: Subject to any disclaimer, the term of this patent is extended or adjusted under 35 U.S.C. 154(b) by 222 days.

(21) Appl. No.: 13/941,101

(22) Filed: Jul. 12, 2013

(65) Prior Publication Data

US 2014/0014087 A1    Jan. 16, 2014

Related U.S. Application Data

(60) Provisional application No. 61/671,669, filed on Jul. 13, 2012.

(51) Int. Cl.
*A47J 37/07* (2006.01)
*A47J 37/06* (2006.01)

(52) U.S. Cl.
CPC .......... *A47J 37/0704* (2013.01); *A47J 37/0611* (2013.01); *A47J 2201/00* (2013.01)

(58) Field of Classification Search
CPC .............................. A47J 37/0704; A47J 37/07
USPC ......... 126/25 R, 9 R, 41 R; 99/349, 331, 330; 219/401
See application file for complete search history.

(56) References Cited

U.S. PATENT DOCUMENTS

| | | | |
|---|---|---|---|
| 992,417 A | 5/1911 | Gale | |
| 2,696,162 A | 12/1954 | Michaelis et al. | |
| 2,817,331 A * | 12/1957 | Kaplan et al. | 126/41 R |
| 3,948,159 A | 4/1976 | Vigerstrom | |
| 4,878,477 A * | 11/1989 | McLane | 126/41 R |
| 5,197,377 A | 3/1993 | Jennings et al. | |
| 6,189,528 B1 * | 2/2001 | Oliver | A47J 37/0704 126/25 R |
| 6,393,970 B1 | 5/2002 | Wu | |
| 7,448,373 B2 * | 11/2008 | Hill | A47J 37/0611 126/25 R |
| 7,954,422 B2 | 6/2011 | Nevarez et al. | |
| 2010/0154773 A1 * | 6/2010 | Lee | A47J 37/06 126/25 R |
| 2015/0238049 A1 * | 8/2015 | Jones | A47J 37/0704 126/25 R |

FOREIGN PATENT DOCUMENTS

| | | |
|---|---|---|
| CN | 101466293 A | 6/2009 |
| JP | 2008-541988 A | 11/2008 |
| WO | 2006132904 A2 | 12/2006 |

OTHER PUBLICATIONS

International Search Report dated Dec. 16, 2013 from corresponding PCT/US2013/050353, pp. 3.

(Continued)

*Primary Examiner* — Gregory Huson
*Assistant Examiner* — Nikhil Mashruwala
(74) *Attorney, Agent, or Firm* — Ohlandt, Greeley, Ruggiero & Perle, L.L.P.

(57) ABSTRACT

The modular grill of the present disclosure contains a plurality of removably connected sub-unit grills, each having their own associated control system. This allows for easy servicing and removal of each sub-unit. In addition, each sub-unit can be set to different cooking parameters if desired, thus allowing for the cooking of different products within the same grill.

5 Claims, 2 Drawing Sheets

(56) References Cited

OTHER PUBLICATIONS

International Written Opinion dated Dec. 16, 2013 from corresponding PCT/US2013/050353, pp. 3.

Office Action dated Nov. 26, 2015 for corresponding Chinese patent application No. 201380037398.X, pp. 9.

Office Action dated Feb. 9, 2016 for corresponding Japanese patent application No. JP2015-521859, pp. 3.

* cited by examiner

MODULAR TWO-SIDED GRILL

CROSS-REFERENCE TO RELATED APPLICATIONS

The present application claims the benefit under 35 U.S.C. §119(e) of U.S. Provisional Application 61/671,669, filed on Jul. 13, 2012, which is herein incorporated by reference.

BACKGROUND OF THE DISCLOSURE

1. Field of the Disclosure

The present disclosure relates to two-sided grills. More particularly, the present disclosure relates to two-sided grills that are separable into two or more sub-units or modules.

2. Description of the Related Art

In currently available two-sided grills, there is one, common lower grill plate for cooking the food product. This one grill plate will hold food products for several upper platens, limiting the ability of the grill to cook different products requiring different lower grill temperatures. The present disclosure addresses this need.

SUMMARY OF THE DISCLOSURE

The present disclosure provides a grill comprising one or more sub-units, each of the sub-units having an associated upper platen and lower grill surface where a food product is cooked. The sub-units are removably connected to one another. When the sub-units are connected to one another to form the grill, there can be a space or gap between adjacent sub-units.

Thus, in one embodiment the present disclosure provides a grill assembly comprising a plurality of sub-unit grills removably connected to one another. Each of the sub-unit grills comprises an associated upper platen and a lower grill surface, so that a food product can be cooked on said lower grill surface between the two. Each of the sub-unit grills also comprises an independent control system associated therewith, so that the amount of energy supplied to an upper platen and a lower grill surface of a first sub-unit can be controlled independently of other sub-units.

DETAILED DESCRIPTION OF THE DISCLOSURE

Figure 1:
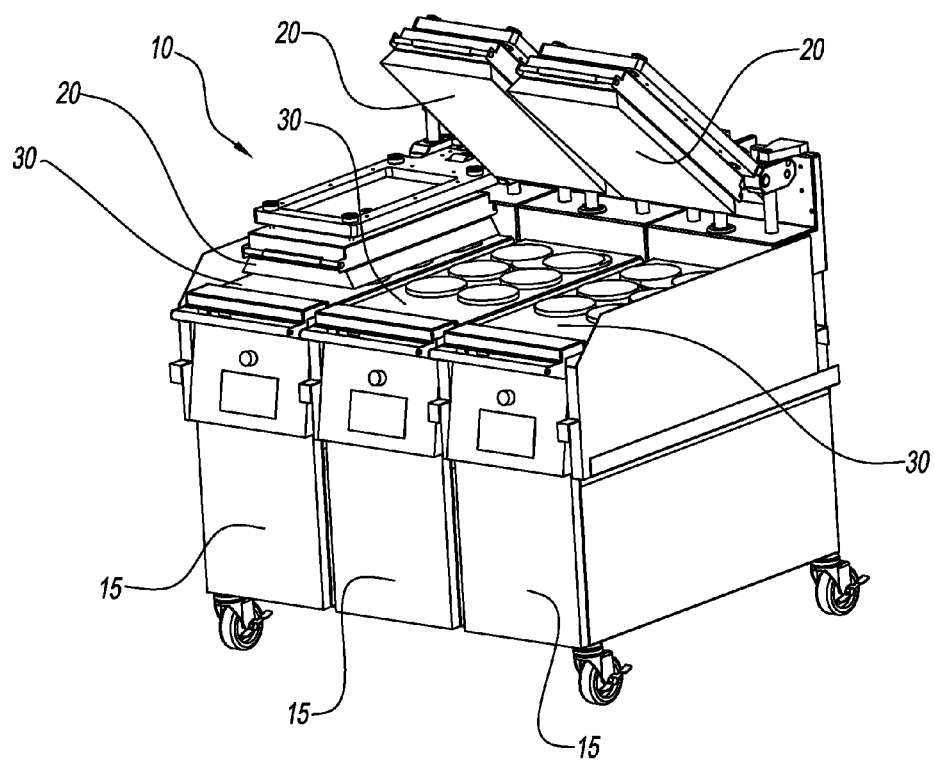
FIG. 1 is a top, perspective view of an assembled grill of the present disclosure.
Figure 2:
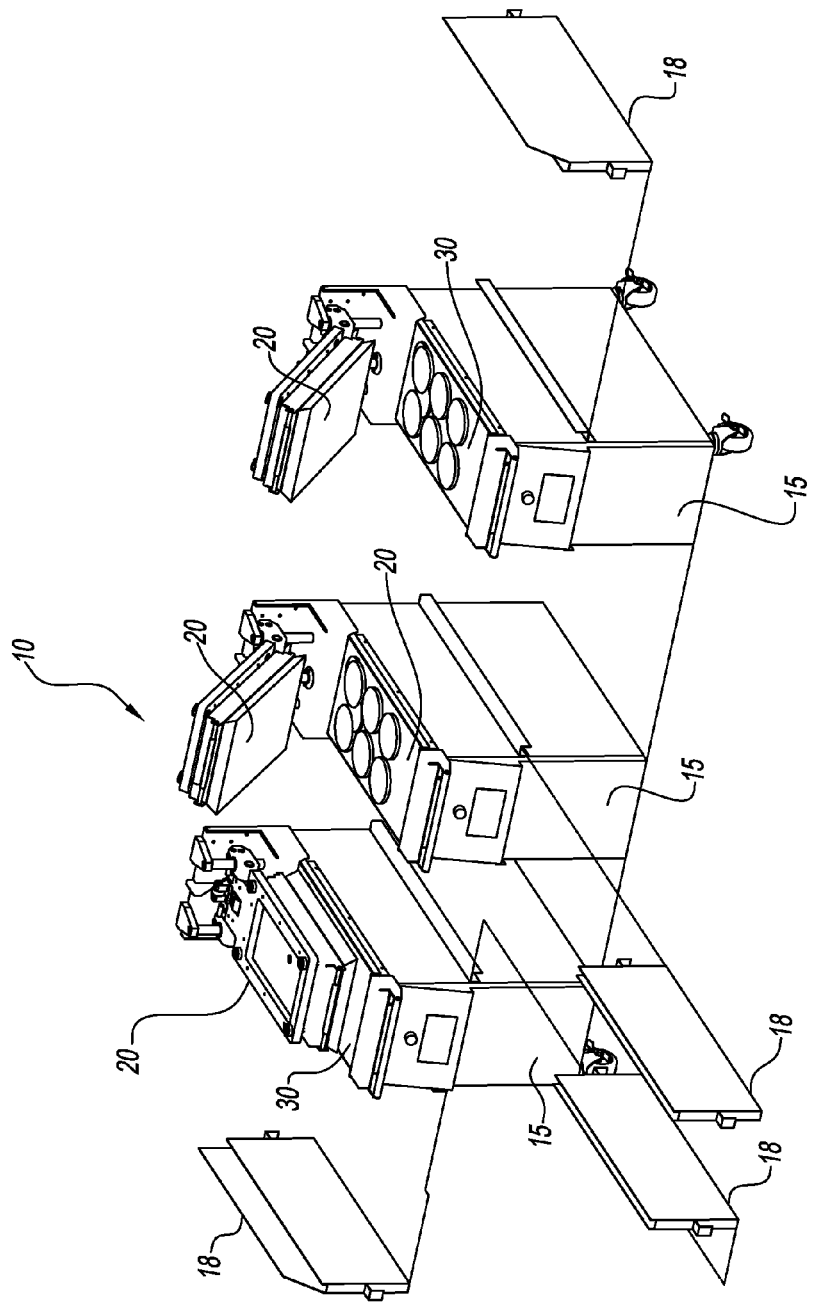
FIG. 2 is an exploded view of the grill of FIG. 1.

Referring to FIGS. 1 and 2, grill 10 of the present disclosure is shown. Grill 10 can be sectioned off into a plurality of sections or modular sub-units 15. Each of sub-units 15 has an upper platen 20 and a lower grill surface 30. Sub-units 15 are removably connected to one another along a generally vertical axis, where platens 20 and surfaces 30 extend along a generally horizontal axis.

The width of each lower grill surface 30 of each of sub-units 15 approximately matches the width of the corresponding upper platen 20. When sub-units 15 are connected together in grill 10, each of the lower grill surfaces 30 and upper platens 20 can be at approximately the same level or height, as they would be in a grill with a unitary or singular grill surface. This makes it easy for an operator to use work with each of sub-units 15 simultaneously.

Each of sub-units 15 is separable from grill 10 as a whole. This improvement over currently available grills allows for the separation of products cooked on adjacent sub-units 15. In addition, when sub-units 15 are assembled together into grill 10, they can be separated from adjacent sub-units 15 by a space large enough to incorporate grease containers 18 between each of sub-units 15. This allows for the grease to be collected or removed from one of sub-units 15 without affecting an adjacent sub-unit 15.

Thus, grill 10 provides several advantages over currently available grills. The power management and load control of grill 10 are enhanced, since each of sub-units 15 can be set to its own lower grill plate temperature without affecting adjacent sub-units 15. The platen 20 and grill surface 30 of each unit 15 can be set to the same or different temperatures for cooking different products, which increases flexibility in menu offerings. Each of sub-units 15 can be turned off when not needed, or set to a reduced temperature, saving energy. The separation of one grill surface, as currently available, to separate grill surfaces 30 in sub-units 15 eliminates cross-contamination of different types of foods. The modular design of grill 10 also allows for easier shipping and servicing of grill 10. Sub-units 15 can be serviced individually, as opposed to having to service a larger grill surface. Sub-units 15 can also be shipped separately and assembled into the grill 10 in the space where they are to be used, as opposed to having to ship one large grill as a single unit. This allows for an easier installation on site, as sub-units 15 will typically be small enough to fit through standard size doorways.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

What is claimed is:

1. A grill assembly, comprising:
    a plurality of sub-unit grills removably connected to one another; and
    a grease collector disposed in a gap between each pair of adjacent sub-units, for collecting grease from one or both of said adjacent sub-units,
    wherein each of said sub-unit grills comprises an associated upper platen and a lower grill surface, so that a food product can be cooked on said lower grill surface between said lower grill surface and said upper platen, and
    wherein each of said sub-unit grills comprises an independent control system associated therewith, so that an amount of energy supplied to an upper platen and a lower grill surface of one of said plurality of sub-units can be controlled independently of an amount of energy supplied to an upper platen and a lower grill surface of other sub-units.

2. The grill assembly of claim 1, wherein said sub-units are connected to one another so that said lower grill surfaces are at approximately the same height.

3. The grill assembly of claim 1, wherein said sub-units are connected to each other along a generally vertical axis.

4. A grill assembly, comprising:
    a plurality of sub-unit grills removably connected to one another along a vertical axis; and a vertically-aligned grease collector disposed in a gap between each pair of adjacent sub-units, for collecting grease from one or both of said adjacent sub-units, wherein each of said sub-unit grills comprises an associated upper platen and a lower grill surface, so that a food product can be cooked on said lower grill surface between said lower grill surface and said upper platen, and wherein each of said sub-unit grills comprises an independent control system associated therewith, so that an amount of energy supplied to an upper platen and a lower grill surface of one of said plurality of sub-units can be controlled independently of an amount of energy supplied to an upper platen and a lower grill surface of other sub-units.

5. The grill assembly of claim 4, wherein said sub-units are connected to one another so that said lower grill surfaces are at approximately the same height.

* * * * *